C. L. MERRY.
EYEGLASS MOUNTING.
APPLICATION FILED DEC. 14, 1914.
1,173,981.
Patented Feb. 29, 1916.
Fig. I.
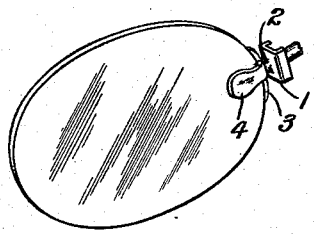
Fig. II.
Fig. III.
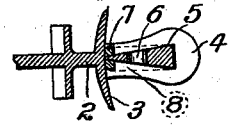
Fig. IV.
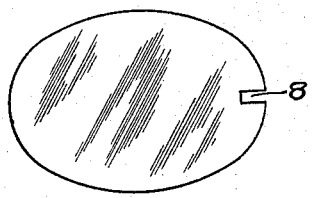
Fig. V.
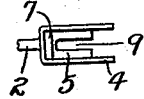
WITNESSES:
Lynn G. Robinson
Retta F. Thomas
INVENTOR
Charles L. Merry.
BY
Arthur C. Brown
ATTORNEY

UNITED STATES PATENT OFFICE.

CHARLES L. MERRY, OF KANSAS CITY, MISSOURI, ASSIGNOR TO MERRY OPTICAL COMPANY, OF KANSAS CITY, MISSOURI, A CORPORATION OF MISSOURI.

EYEGLASS-MOUNTING.

1,173,981.    Specification of Letters Patent.    Patented Feb. 29, 1916.

Application filed December 14, 1914. Serial No. 877,164.

*To all whom it may concern:*

Be it known that I, CHARLES L. MERRY, a citizen of the United States, residing at Kansas City, in the county of Jackson and State of Missouri, have invented certain new and useful Improvements in Eyeglass-Mountings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to eyeglass or spectacle mountings, and has for its principal object to provide a mounting which may be rigidly and securely attached to a lens otherwise than by the use of the ordinary screw.

In accomplishing this object I have provided the improved details of structure, the preferred forms of which are illustrated in the accompanying drawings, wherein:—

Figure I is a perspective view of a part of an eyeglass mounting, showing one of the lenses and its attachment to the mounting. Fig. II is an enlarged detail perspective of one of the attachments. Fig. III is a sectional view of the same, particularly illustrating the wedge-shaped keeper web. Fig. IV is a detail view of a lens adapted for use with my invention. Fig. V is an elevational view of a modified form of attachment.

Referring more in detail to the parts:—1 designates an eye-glass mounting of any ordinary construction, comprising the lens attachment post 2, the ordinary lens straps 3 that lie along the edge of the lens, and the ears 4, which extend from the straps and lie along the faces of the lens; the parts described being of the same general appearance as like parts in an ordinary screw attachment, except that the screw holes in the ears may be eliminated.

Extending between and rigidly connected with the ears of each of the attachments so as to form a firm and permanent connection therebetween, that will obviate springing or bending of the ears when the mounting is assembled with a lens, is a keeper 5, which is soldered in position or may be formed integrally with the ears and straps; the cross section of the web being preferably wedge-shaped with the base of the wedge at the outer end and the point at the base of the ears; the keeper web being preferably arranged centrally relative to the ears and provided with an opening 6 through which cement may pass, in order to provide a uniform joint, as will presently be described.

In order to brace the lens in the mounting, I preferably provide the keeper web with ears 7, which are arranged adjacent the lens straps and are of substantially the same width as the slot in the lens, so that they may engage the sides of the seat and brace the lens at the inner and outer ends of the slot. It is apparent that with this construction the cement may flow between the base of the web wedge and the ears to bind the parts together.

The lenses with which the mountings are used are provided with slits 8 for receiving the web 5 when the parts are assembled.

In assembling a lens with a mounting of this construction, presuming the lens to be slit as shown (Fig. IV), cement is placed on the inner faces of the ears and keeper web and the lens projected between the ears, so that the web will extend into the slot 8 in the lens, the surplus cement on the ears and web filling the open spaces in the slot at the narrow end of the web so as to form obstructions that will prevent the web being drawn out of the slit, and affording a solid, substantial anchorage for the lens, it being apparent that while the cement is in a plastic state it will flow through the apertures 6 in the web, should there be more cement on one side of the web than on the other, to equalize the supply on both sides of the web and along the opposite faces of the lens.

I prefer to make the keeper webs shorter than the ears, in order that the ears may have relatively free outer ends so that they may be bent down closely against the faces of the lens to form a snug contact therewith, and so that the ears may be adjusted to the curvature of a lens.

In order to adapt the mounting to lenses of decided convex or concave types, it may be desirable that the ears of the mounting be free to bend at their outer ends in order to more readily adapt them to the curvature of the lens. In order to provide for this possibility the outer end of the keeper web may have a slit 9 opening from the outer end to the aperture 6, so that the web as well as the ears may bend.

It is apparent that the modified form may be applied to the lens in the same manner as the preferred form, and that when the parts are assembled the same permanent and sightly connection may be made.

While I have illustrated my improvements in connection with an eye-glass mounting, it is apparent that they are as readily adaptable to spectacle mountings.

Having thus described my invention, what I claim as new therein, and desire to secure by Letters-Patent, is:

1. An eye-glass or spectacle mounting comprising ears spaced to lie on opposite sides of a lens, a web located between the ears and adapted for projection into the body of a lens, and ears on said web for bracing the lens from the web.

2. An eye-glass or spectacle mounting comprising ears spaced to lie on opposite sides of a lens, a wedge-shaped web located between the ears and extending longitudinally relative thereto, and ears projecting laterally from the point of the wedge and adapted for coöperation with the wedge base to brace a lens from the web.

3. An eye-glass or spectacle mounting comprising ears spaced to lie on opposite sides of a lens, a wedge-shaped web connecting said ears, with its base facing outwardly and its point located adjacent the base portions of the ears, and ears projecting laterally from the point end of the web to coöperate with the wedge base in bracing a lens, substantially as set forth.

4. An eye-glass or spectacle mounting comprising ears spaced to receive a lens therebetween, and a web lying between the ears and having an opening, for the purpose set forth.

5. An eye-glass or spectacle mounting comprising ears spaced to receive a lens therebetween, and a web connecting the ears and having a transverse slot therein opening through its outer end.

In testimony whereof I affix my signature in presence of a witness.

CHARLES L. MERRY.

Witness:
LETA E. COATS.

Copies of this patent may be obtained for five cents each, by addressing the "Commissioner of Patents, Washington, D. C."